(12) United States Patent
Nakazawa

(10) Patent No.: US 6,828,750 B2
(45) Date of Patent: Dec. 7, 2004

(54) METHOD OF CONTROLLING A MOTOR AND DEVICE THEREFOR

(75) Inventor: Yosuke Nakazawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 43 days.

(21) Appl. No.: 10/370,066

(22) Filed: Feb. 21, 2003

(65) Prior Publication Data

US 2003/0169012 A1 Sep. 11, 2003

(30) Foreign Application Priority Data

Feb. 21, 2002 (JP) ................................. P2002-045155

(51) Int. Cl.[7] ............................................... H02P 6/16
(52) U.S. Cl. ................................... 318/701; 318/254
(58) Field of Search ................................ 318/138, 139, 318/254, 439, 701, 720–724, 685, 696

(56) References Cited

U.S. PATENT DOCUMENTS

| | | | |
|---|---|---|---|
| 4,611,157 A | * | 9/1986 | Miller et al. ................. 318/696 |
| 5,854,547 A | | 12/1998 | Nakazawa |
| 6,121,736 A | * | 9/2000 | Narazaki et al. ............. 318/254 |
| 6,274,960 B1 | | 8/2001 | Sakai et al. |
| 6,339,308 B2 | * | 1/2002 | Shinnaka ..................... 318/701 |
| 6,342,745 B1 | | 1/2002 | Sakai et al. |
| 6,429,620 B2 | | 8/2002 | Nakazawa |
| 6,462,491 B1 | * | 10/2002 | Iijima et al. ................. 318/254 |
| 6,501,243 B1 | * | 12/2002 | Kaneko et al. ............. 318/700 |
| 6,555,988 B2 | * | 4/2003 | Masaki et al. .............. 318/721 |

* cited by examiner

*Primary Examiner*—Bentsu Ro
(74) *Attorney, Agent, or Firm*—Foley & Lardner LLP (57) ABSTRACT

A control device supplies an operating voltage instruction to a PWM inverter that drives a motor and, if the inferred axis of the rotor permanent magnet flux direction is defined as the dr axis, the direction orthogonal to the dr axis as the qr axis, and an axis offset by a predetermined angle from said dr axis as the γ axis, on the γ axis, the inferred γ axis voltage value which is inferred and calculated by using the detected value of the motor current and motor equivalent circuit constant and the γ axis component voltage applied to the motor are compared, and the dr axis phase difference is inferred and calculated so that the deviation of these becomes substantially zero.

10 Claims, 8 Drawing Sheets

METHOD OF CONTROLLING A MOTOR AND DEVICE THEREFOR

CROSS-REFERENCE TO RELATED APPLICATION

This application claims benefit of priority to Japanese Application No. JP2002-45155 filed Feb. 21, 2002, the entire content of which is incorporated by reference herein.

BACKGROUND OF THE INVENTION

1. Field of the Invention

The present invention relates to a method of controlling a motor that may suitably be applied to a reluctance motor, permanent magnet reluctance motor of a design with a high reluctance torque ratio or to an embedded magnet motor etc. and to a device therefor.

2. Description of the Related Art

Conventionally, when controlling the output torque of a permanent magnet motor or reluctance motor with high precision at high speed, it was necessary to provide a rotor position sensor for supplying current corresponding to the position of the motor rotor.

However, since a rotor position sensor is of comparatively large volume, it invites restrictions regarding arrangement, and causes of failure such as difficulty of arranging control transmission wiring for transmitting the sensor output to the control device, or disconnection etc are increased.

In this regard, in the case of a permanent magnet motor, it is possible to ascertain the rotor position indirectly by detecting the motor back e.m.f. (that is to say, back electromotive force) generated during rotation due to the permanent magnet magnetic flux. However, in the case of a reluctance motor, where no back e.m.f. is generated by the permanent magnet and also in the case of a reluctance torque/permanent magnet motor, the motor back e.m.f. is relatively small in a motor of a design in which the ratio of the reluctance torque with respect to the permanent magnet torque is high, so the motor back e.m.f. cannot be accurately detected. It was therefore not possible to ascertain the rotor position.

Figure 1:
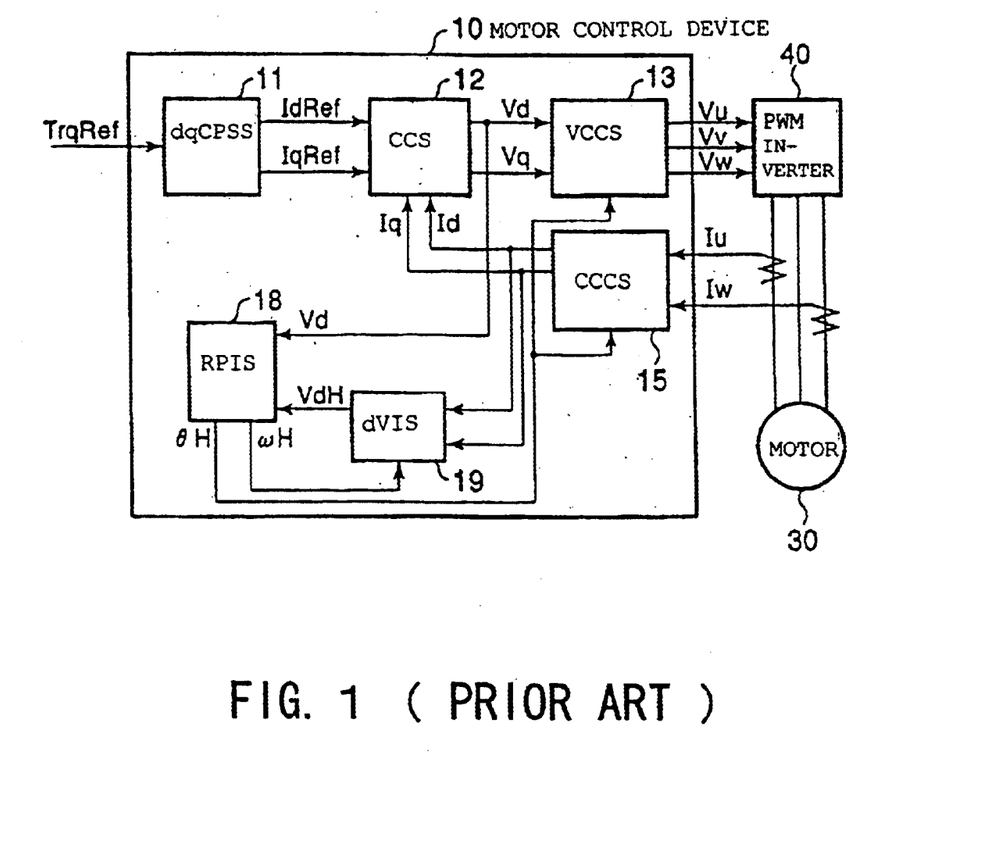
FIG. 1 is a block diagram showing an example of a prior art motor control device.

FIG. 1 shows an example of the construction of a control block of a motor control device in which control is effected by inferring the rotor position of a permanent magnet motor without using a rotor position sensor, as was done conventionally.

As shown in FIG. 1, a motor control device 10 controls a PWM inverter 40 that drives a permanent magnet motor 30 and comprises a dq current pattern setting section (dqCPSS) 11, current control section (CCS) 12, voltage co-ordinate conversion section (VCCS) 13, current co-ordinate conversion section (CCCS) 15, rotor position inferring section (RPIS) 18 and d voltage inferring section (dVIS) 19.

In this motor control device 10, the permanent magnet flux direction is defined as the dr axis direction. If the direction orthogonal thereto is taken as the qr axis, the back e.m.f. (that is to say, back electromotive force) generated by rotation of the permanent magnet motor 30 is generated only in the qr axis direction.

Consequently, if the interred orthogonal co-ordinates of the rotor position are defined as the dr and qr axes and the inferred angle of the rotor position is successively corrected such that the induced voltage in the dr axial direction becomes zero, for the true d and q axes, the d axis coincides with the dr axis and the q axis coincides with the qr axis, so the true rotor position can be inferred.

However, in recent years, permanent magnet reluctance motors and embedded magnet motors which are designed to have a large reluctance torque ratio have started to be used in applications such as electric automobiles.

When the conventional method of inferring rotor position described above is applied to such motors, in some conditions it may be impossible to infer the rotor position accurately.

Figure 4A:
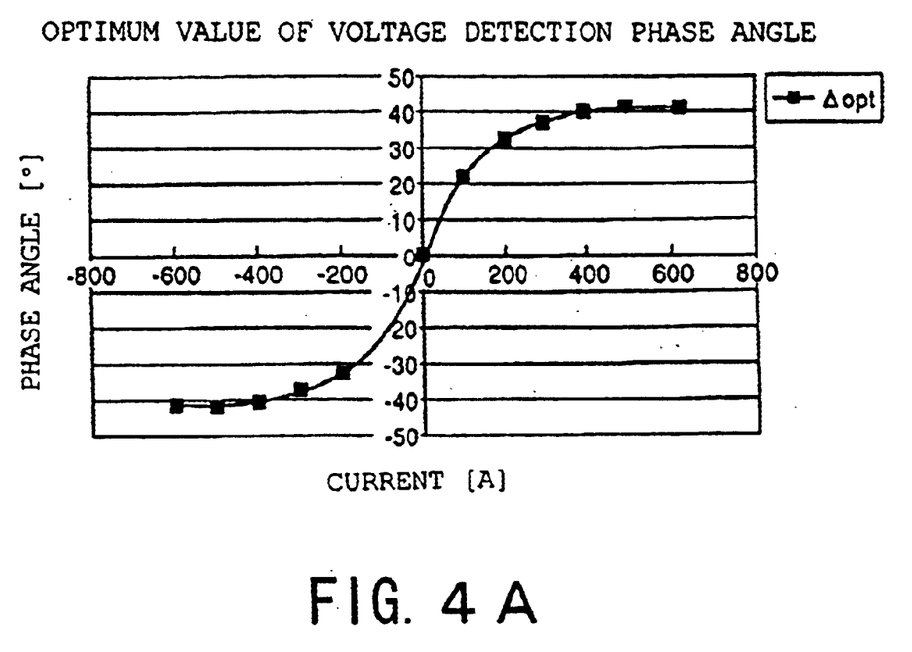
FIG. 4A, FIG. 4B and FIG. 4C are views showing the operation of a setting section for setting a phase difference δ according to the first embodiment.
Figure 4B:
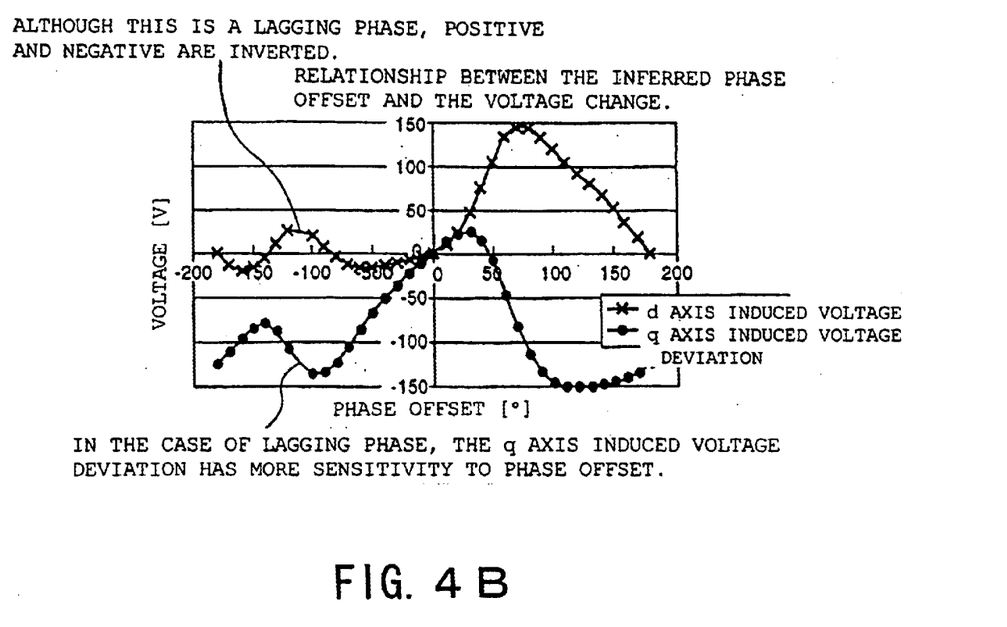

For example, in the case of a motor whose motor equivalent circuit constants are Ld=181 $\mu$H, Lq=466 $\mu$H, $\Phi$PM=0.068 Wb (where Ld and Lq are the d and q axis inductances and $\Phi$PM is the permanent magnet flux), taking the deviation between the inferred rotor phase $\theta$H and the true rotor phase $\theta$ along the horizontal axis, FIG. 4B shows the results of measuring the calculated value $\Delta$Vd of the induced d axis voltage for various phase deviations.

In rotor position inference in a conventional motor control device, the rotor position is inferred by successively correcting the inferred value of the rotor position such that $\Delta$Vd becomes zero.

As shown in FIG. 4B, $\Delta$Vd is assigned a value that is substantially close to zero when the deviation between the inferred rotor phase $\theta$H and the true rotor phase $\theta$ is negative.

The reason for this is that, if the conventional control system is employed, even though the inferred rotor phase departs greatly from the true phase, since $\Delta$Vd is close to 0, it is assumed that a substantially correct position has been inferred and correction is therefore discontinued. As a result, the correct rotor position cannot be inferred.

SUMMARY OF THE INVENTION

Accordingly, in a motor such as a reluctance motor, permanent magnet reluctance motor designed with a high reluctance torque ratio, or embedded magnet motor, one object of the present invention is to provide a novel method of controlling a motor capable of controlling output torque with high precision and high speed whereby the rotor position can be accurately inferred without providing a rotor position sensor, and a device therefor.

In order to achieve the above object, the present invention is constituted as follows. Specifically, in a method of controlling a reluctance torque/permanent magnet motor comprising a rotor having protuberant magnetic polarity, if the inferred axis of the rotor permanent magnet flux direction is defined as the dr axis, the direction orthogonal to this dr axis as the qr axis, and an axis offset by a predetermined angle from said dr axis as the $\gamma$ axis, on this $\gamma$ axis, the $\gamma$ axis inferred voltage value which is inferred and calculated using the detected value of the motor current and motor equivalent circuit constant and the $\gamma$ axis component voltage applied to said motor are compared, and the dr axis phase angle is inferred and calculated such that the deviation thereof is substantially zero.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views, and more particularly to FIG. 2 thereof, one embodiment of the present invention will be described.

(First Embodiment)

A first embodiment is described with reference to FIG. 2 to FIG. 4A, FIG. 4B and FIG. 4C.

Figure 2:
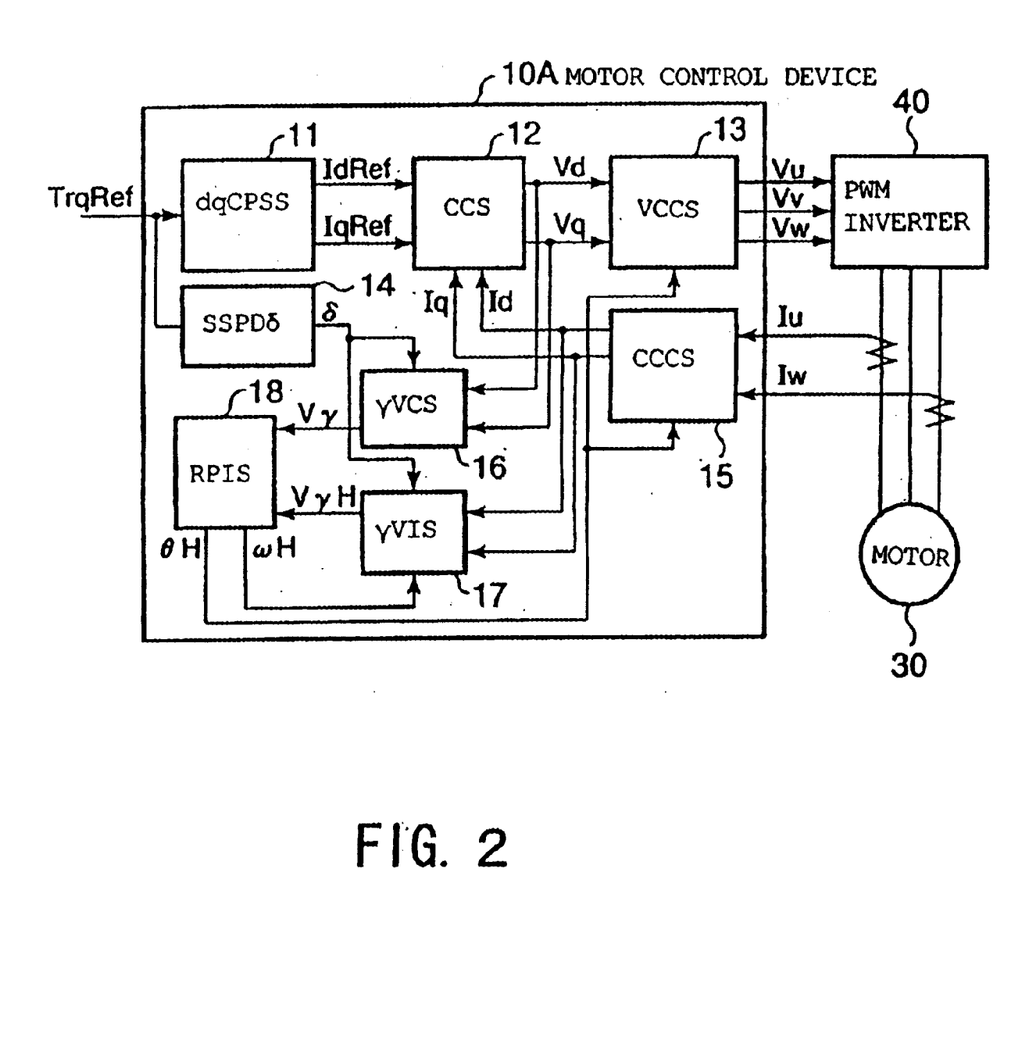
FIG. 2 is a block diagram showing a first embodiment of a method of controlling a motor according to the present invention and a device therefor.

As shown in FIG. 2, a motor control device 10A according to a first embodiment controls a PWM inverter 40 that drives a motor 30 and comprises a dq current pattern setting section (dqCPSS) 11, a current control section (CCS) 12, a voltage co-ordinate conversion section (VCCS) 13, a setting section 14 for the phase difference δ (SSPDδ), a current co-ordinate conversion section (CCCS) 15, a γ voltage calculation section (γVCS) 16, a γ voltage inference section (γVIS) 17 and a rotor position inference section (RPIS) 18.

The dq current pattern setting section 11 inputs a torque instruction torqRef and finds and outputs the d axis current instruction IdRef and q axis current instruction IqRef that are most suitable for outputting this torque. The optimum values of IdRef and IqRef are selected for example such that the motor current vector length IlRef required for outputting the same torque is a minimum. The d and q axis current constructions IdRef and IqRef are then found by the following procedure.

$$IdRef = \frac{-\Phi PM - \sqrt{\Phi PM^2 + 8 \cdot \Delta L^2 \cdot IlRef^2}}{4 \cdot \Delta L}$$

where ΦPM is the permanent magnet flux, $$\Delta L = Ld - Lq$$

Ld is the d axis inductance and Lq is the q axis inductance and
where $$IlRef = \sqrt{IdRef^2 + IqRef^2}$$

is the current amplitude.

Id and Iq satisfying the above expressions when the current amplitude IlRef is varied as a parameter are found and, in addition, the torque Trq that is then generated by the motor is found by the following expression.

$$Trq = p \cdot (\Phi PM + \Delta L \cdot Id) \cdot Iq$$

(where P is a motor pole pair)

Figure 3A:
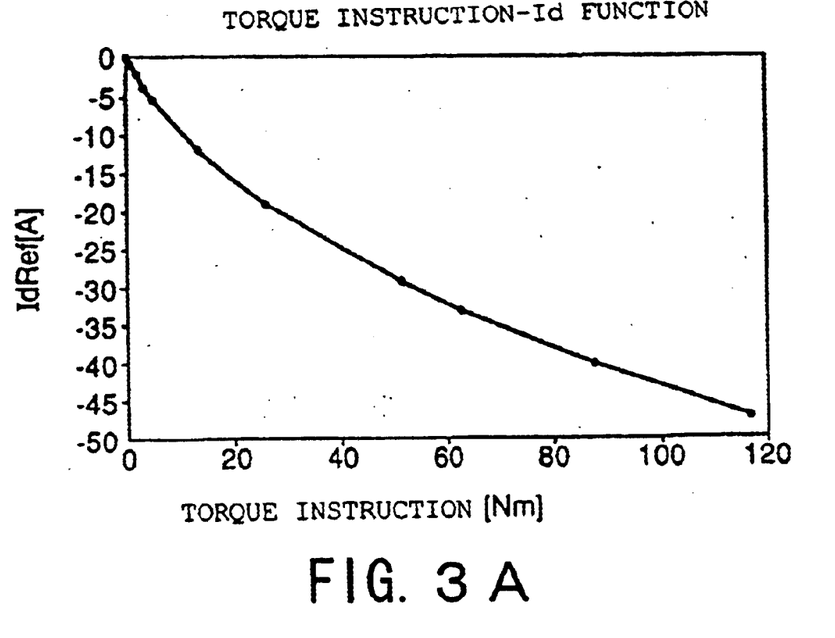
FIG. 3A and FIG. 3B are views given in explanation of the operation of a setting section for setting a dq current pattern according to a first embodiment.

FIG. 3A shows the functional relationship of the torque instruction and the d axis current instruction of a permanent magnet reluctance motor wherein the motor equivalent circuit constant is ΦPM=0.09, Ld=5 mH, Lq=15 mH and the number of poles p=4. The d axis current instruction IdRef is found using the function graph of FIG. 3A from the input torque instruction, and is then output.

Figure 3B:
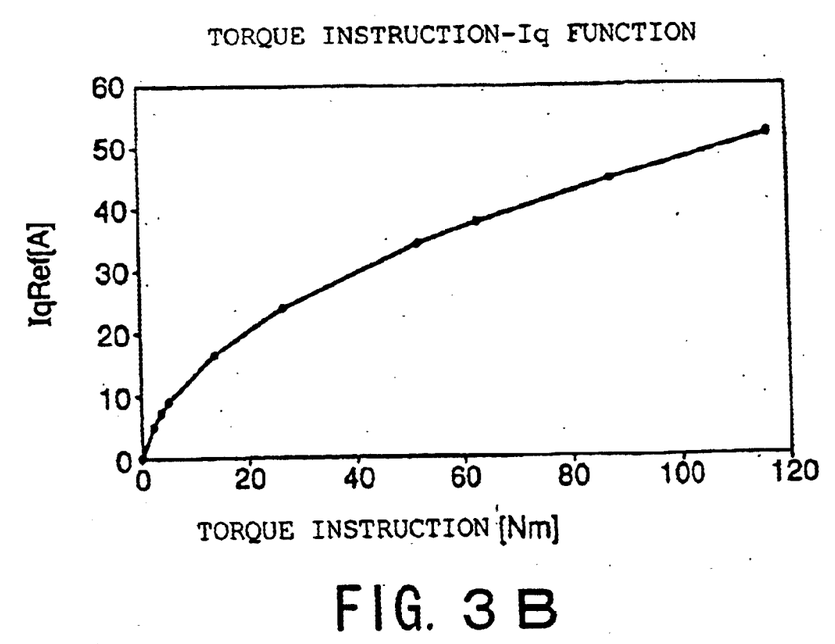

FIG. 3B likewise shows the functional relationship of the torque and the q axis current instruction. The q axis current instruction IqRef is found using the function graph of FIG. 3B from the input torque instruction, and is then output.

The current control section 12 inputs the d and q axis current instructions IdRef, IqRef that are output from the d and q current pattern setting section 11 and the d and q axis currents Id, Iq that are output from the three-phase→dq conversion section 15 and calculates and outputs the d and q axis voltage instructions Vd, Vq by the following calculation such that the d and q axis currents respectively track the d and q axis current instructions.

$$Vd = (Kp + Ki/s) \times (IdRef \cdot Id)$$

$$Vq = (Kp + Ki/s) \times (IqRef \cdot Iq)$$

(where s is the Laplace operator, Kp is the proportional gain and Ki is the integrated gain).

The voltage co-ordinate conversion section 13 inputs the d and q axis voltage instructions Vd, Vq that are output from the current control section 12 and the inferred value of the rotor position θH that is output from the rotor position inference section 18 and, using the generally known dq co-ordinates to three-phase conversion expression, finds the three-phase voltage instructions Vu, Vd and Vw by the following calculation and outputs these as operating voltage instructions for the PWM inverter.

$$VI = \sqrt{Vd^2 + Vq^2} \quad \text{[math 4]}$$

$$\delta V = \tan^{-1}\left(\frac{Vq}{Vd}\right)$$

$$Vu = \sqrt{\frac{2}{3}} \cdot VI \cdot \cos(\theta H + \delta V)$$

$$Vv = \sqrt{\frac{2}{3}} \cdot VI \cdot \cos\left(\theta H + \delta V - \frac{2}{3}\pi\right)$$

$$Vw = \sqrt{\frac{2}{3}} \cdot VI \cdot \cos\left(\theta H + \delta V - \frac{4}{3}\pi\right)$$

The current co-ordinate conversion section 15 inputs the current detection values Iu, Iw of two phases of the three phases and the inferred value of the rotor position θH that is output from the rotor position inference section 18 and finds and outputs the d and q axis currents Id, Iq by the following calculation.

$$Id = \sqrt{\frac{3}{2}} \left\{ \frac{2}{\sqrt{3}} \left( Iu \cdot \sin\left(\theta H + \frac{2}{3}\pi\right) - Iw \cdot \sin\theta H \right) \right\}$$

$$Iq = \sqrt{\frac{3}{2}} \left\{ \frac{2}{\sqrt{3}} \left( Iu \cdot \cos\left(\theta H + \frac{2}{3}\pi\right) - Iw \cdot \cos\theta H \right) \right\}$$

The γ voltage calculation section 16 inputs the d and q axis voltages Vd and Vq that are output from the current control section 12 and the phase difference δ (or phase angle deviation) that is output from the setting section 14 for the phase difference δ and calculates and outputs the γ voltage vγ by the following calculation.

$$V\gamma = Vd \times \cos(\delta) + Vq \times \sin(\delta)$$

The γ voltage inference section 17 inputs the d and q axis currents Id and Iq that are output from the current co-ordinate conversion section 15, the inferred value of the rotor angular velocity ω that is output from the rotor position inference section 18 and the phase δ that is output from the setting section 14 for the phase difference δ and finds and outputs the inferred value VγH of the γ voltage by the following calculation.

First of all, the d and q axis inferred voltage values VdH and VqH are found by the following calculation.

$$\begin{bmatrix} VdH \\ VqH \end{bmatrix} = \begin{bmatrix} R + s \cdot Ld & -\omega H \cdot Lq \\ -\omega H \cdot Ld & R + s \cdot Lq \end{bmatrix} \cdot \begin{bmatrix} Id \\ Iq \end{bmatrix} + \begin{bmatrix} 0 \\ \omega H \cdot \Phi PM \end{bmatrix} \quad \text{[math 7]}$$

(where R is the winding resistance, Ld is the d axis inductance, Lq is the q axis inductance, ΦPM is the permanent magnet flux, and s is the Laplace operator)

The inferred γ voltage value VγH is found by the following calculation, using the d and q axis inferred voltage values found from the above.

$$V\gamma H = VdH \times \cos(\delta) + VqH \times \sin(\delta) \quad \text{[Math 8]}$$

The setting section 14 for the phase difference δ inputs the torque instruction TrqRef and, when error is generated between the motor inferred rotor phase θH and the true rotor phase θ, extracts and outputs in accordance with the torque instruction a value obtained by finding beforehand analytically or experimentally the phase difference δ (or phase angle deviation) in the vicinity where the voltage change is largest.

FIG. 4A shows an example of the set value of the phase difference δ of a motor for which the motor equivalent circuit constants are Ld=181 μH, Lq=466 μH, ΦPM=0.068 Wb (where Ld and Lq are the d and q axis inductances and ΦPM is the permanent magnet flux). FIG. 4B shows the results of measurement of the error ΔVd of the d axis inferred voltage value VdH and the actual value Vd of the d axis voltage at each phase deviation and the error ΔVq of the q axis inferred voltage value VqH and the actual value Vq of the q axis voltage, with the deviation between the inferred rotor phase θH and the true rotor phase θ shown on the horizontal axis.

Rotor position inference in a conventional motor control device was performed by inferring the rotor position by successive correction (sequential correction) of the inferred value of the rotor position such that ΔVd became 0.

As shown in FIG. 4B, ΔVd is assigned a value substantially close to zero when the deviation between the inferred rotor phase θH and of the true rotor phase θ is negative.

The reason for this is that, if the conventional control system is employed, even though the inferred rotor phase departs greatly from the true phase, since ΔVd is close to 0, it is assumed that a substantially correct position has been inferred and correction is therefore discontinued. As a result, the correct rotor position cannot be inferred.

Figure 4C:
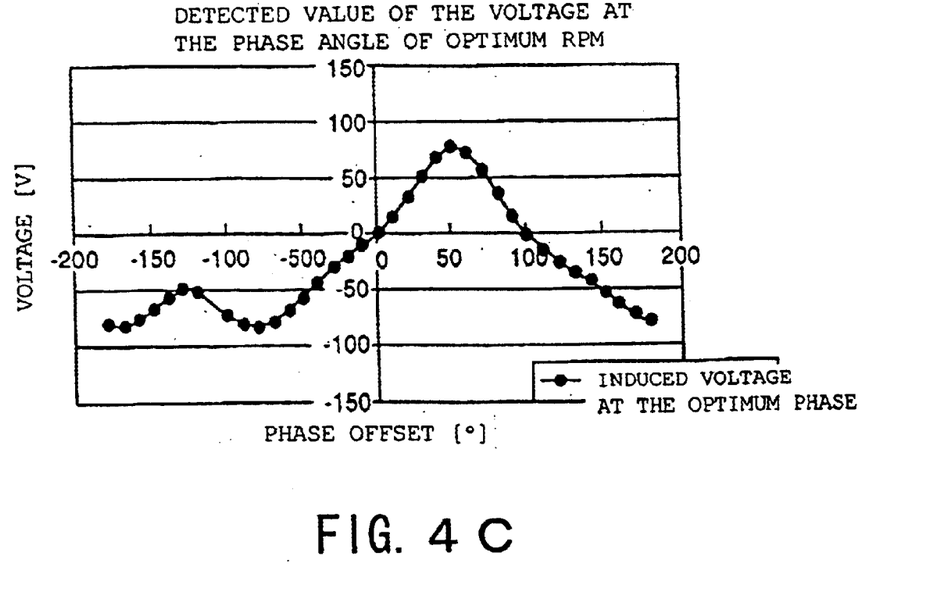

FIG. 4C shows the measurement results taking the voltage error ΔVγ in the direction of the γ axis, which is offset from the d axis by the phase difference δ shown in FIG. 4A, as the vertical axis and taking the deviation between the inferred rotor phase θH and the true rotor phase θ as the horizontal axis. In the situation that the rotor phase difference (rotor phase deviation) is negative, a large ΔVγ is output, so, if successive correction of the inferred phase θH is performed such that ΔVγ converges to zero, the result is that the inferred rotor phase θH tracks the true rotor phase θ.

The rotor position inference section 18 inputs the γ voltage Vγ that is output from the γ voltage calculation section 16 and the inferred γ voltage value VγH that is output from the γ voltage inference section 17 and finds and outputs the inferred value of the rotor position θH and the inferred value ωH of the rotor angular velocity such that the deviation between Vγ and VγH is zero.

$$\omega H = \frac{KpSL \cdot s + KiSL}{s} \cdot Kpn \cdot (V\gamma H - V\gamma) \quad \text{[math 9]}$$

When ωH>0, Kpn=1
When ωH<0, Kpn=−1
(where KpSL is the proportional gain, KiSL is the integrated gain and s is the Laplace operator)

By employing a motor control device constructed as above, even when the motor 30 is constituted by a reluctance motor or reluctance torque/permanent magnet motor designed with a high ratio of the reluctance torque with respect to the permanent magnet torque, the rotor position can be accurately inferred without providing a rotor position sensor.

(Second Embodiment)

Figure 5:
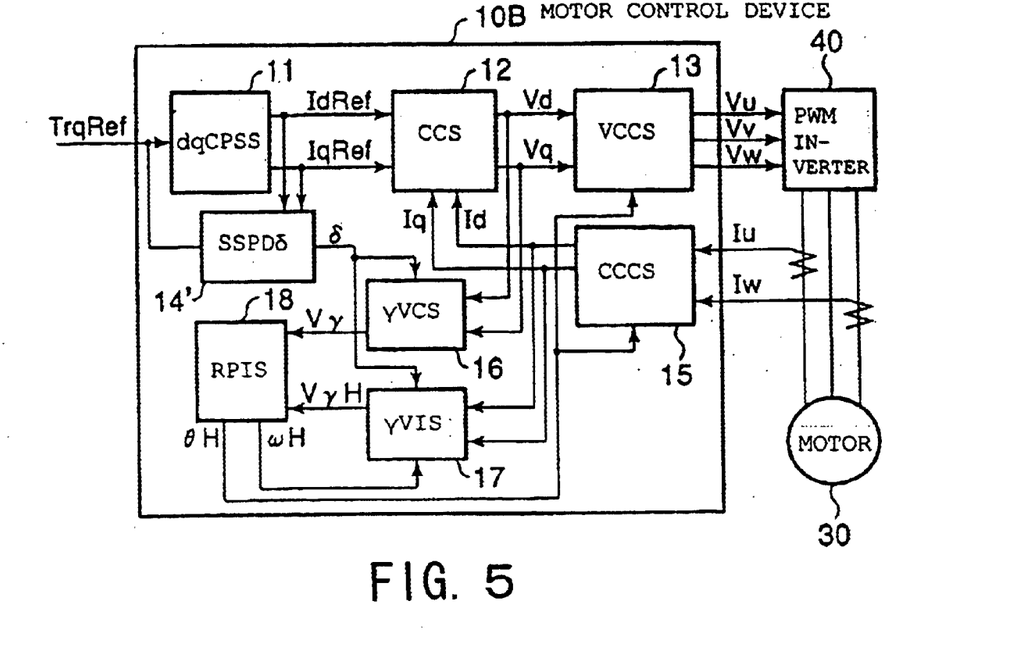
FIG. 5 is a block diagram showing a second embodiment of a method of controlling a motor and a device therefor according to the present invention.

Next, a second embodiment is described with reference to FIG. 5.

The structural elements of the motor control device 10B of the second embodiment are the same as in the case of the first embodiment apart from the setting section 14' for the phase difference δ (SSPDδ).

The setting section 14' for the phase difference δ inputs the d and q axis current instructions IdRef, IqRef that are output from the dq current pattern setting section 11 and finds and outputs the phase difference δ (sometimes phase angle deviation difference δ is used) by the following calculation.

$$\delta = -\tan^{-1}\left(\frac{Iq\ Ref}{Id\ Ref}\right) \quad \text{[math 10]}$$

If the phase angle θ is set using the above expression, if an error is generated between the motor rotor phase angle θH and the true rotor phase θ, the voltage change in the γ axis direction may be made substantially a maximum. The basis for this lies in the error voltage expression given below.

If the deviation between the inferred phase angle θH and the true phase angle θ is defined as Δθ, the error ΔVd of the actual value of the d axis voltage and the inferred value of the d axis voltage and the error ΔVq of the actual value of the q axis voltage and the inferred value of the q axis voltage can be respectively approximately found by the following expressions.

$$\Delta Vd = \omega \cdot (L\delta \cdot Lq) \cdot Iq \cdot \sin(\Delta\theta) \cdot \omega \cdot \Phi PM \quad \text{[Math 11]}$$

$$\Delta Vq = \omega \cdot (L\gamma \cdot Ld) \cdot Id$$

where $$L\gamma = \tfrac{1}{2} \cdot \{(Ld+Lq) - (Lq-Ld) \cdot \cos(2 \cdot \Delta\theta)\}$$

$$L\delta = \tfrac{1}{2} \cdot \{(Ld+Lq) + (Lq-Ld) \cdot \cos(2 \cdot \Delta\theta)\}$$

In the expression for ΔVd, since the first term on the right-hand side has a double component with respect to Δθ and is an even function, it acts in the direction such as to reduce the voltage deviation in respect of negative phase error (i.e. such that the phase error is more difficult to identify). Consequently, if ΔVd and ΔVq are utilized so as to cancel this term, the voltage deviation with respect to the phase error can be made substantially a maximum.

If the phase angle δ as above is defined by the following expression, terms which are even functions with regard to Δθ can be cancelled when the voltage deviation ΔVγ in the γ axis direction is found by the following expression.

$$\delta = -\tan^{-1}\left(\frac{Iq\ Ref}{Id\ Ref}\right)$$ [math 12]

$$\Delta V\gamma = \Delta Vd \cdot \cos(\delta) + \Delta Vq \cdot \sin(\delta)$$

By employing a motor control device 10B constructed as above, when error is generated between the motor inferred rotor phase θH and the true rotor phase θ, the phase angle δ in the vicinity in which the voltage change is largest can be found by a simple calculation and even when the motor 30 is constituted by a reluctance motor or reluctance torque/permanent magnet motor designed with a high ratio of the reluctance torque with respect to the permanent magnet torque, the rotor position can be accurately inferred without providing a rotor position sensor.

(Third Embodiment)

Figure 6:
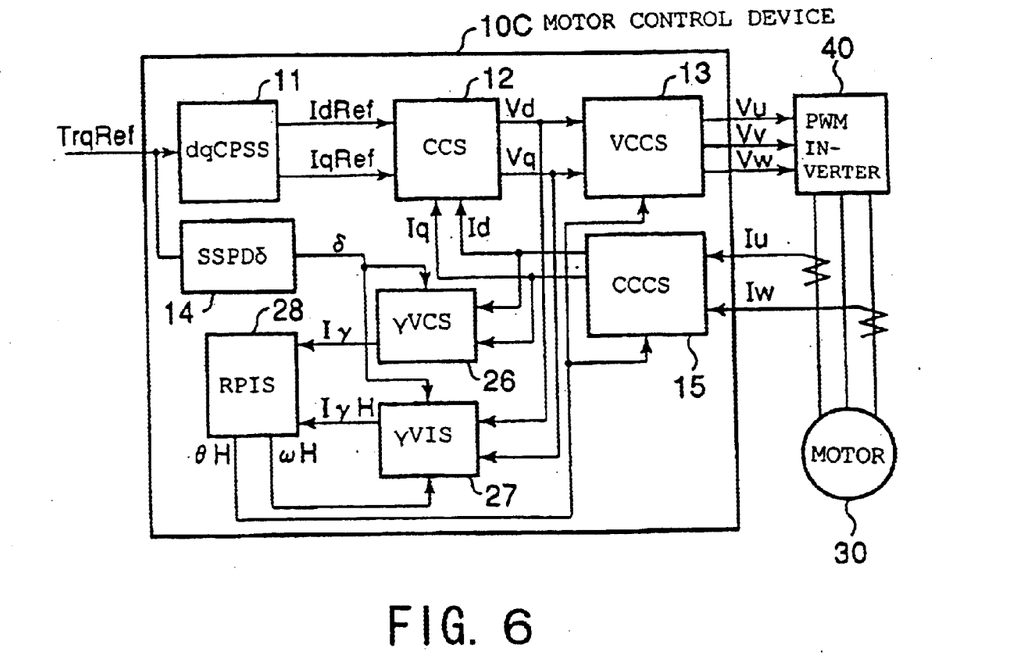
FIG. 6 is a block diagram showing a third embodiment of a method of controlling a motor and a device therefor according to the present invention.

Next, a third embodiment is described with reference to FIG. 6.

A motor control device 10C in the third embodiment comprises a dq current pattern setting section (dqCPSS) 11, a current control section (CCS) 12, a voltage co-ordinate conversion section (VCCS) 13, a setting section 14 for the phase difference δ (SSPDδ), a current co-ordinate conversion section (CCCS) 15, a γ current calculation section (γCCS) 26, a γ current inferring section (γCIS) 27 and a rotor position inferring section (RPIS) 28.

The construction and operation of the dq current pattern setting section 11, current control section 12, voltage co-ordinate conversion section 13, setting section 14 for the phase difference δ and current co-ordinate conversion section 15 are the same as in the case of the first embodiment.

The γ current calculation section 26 inputs the d and q axis current Id, Iq that are output from the current co-ordinate conversion section 15 and the phase difference δ that is output from the setting section 14 for the phase difference δ and calculates and outputs the γ current Iγ by the following calculation.

$$I\gamma = Id \times \cos(\delta) + Iq \times \sin(\delta)$$ [Math 13]

The γ current inferring section 27 inputs the d and q axis voltages Vd and Vq that are output from the current control section 12, the inferred value of the rotor angular velocity ωH that is output from the rotor position inferring section 18 and the phase difference δ that is output from the setting section 14 for the phase difference δ and finds and outputs the inferred value I γH of the γ current by the following calculation.

First of all, the inferred values IdH and IqH of the d and q axis currents are found by the following calculation.

$$IdH\frac{1}{s \cdot Ld} \cdot (Vd - R \cdot IdH + \omega H \cdot Lq \cdot IqH)$$ [math 14]

-continued $$IqH = \frac{1}{s \cdot Lq} \cdot (Vq - R \cdot IqH + \omega H \cdot Ld \cdot IdH + \omega H \cdot \Phi PM)$$

(where R is the winding resistance, Ld is the d axis inductance, Lq is the q axis inductance, θPM is the permanent magnet flux, and s is the Laplace operator)

The inferred value IγH of the γ current is found by the following calculation, using the inferred values of the d and q axis currents found as described above.

$$I\gamma H = IdH \times \cos(\delta) + IqH = \sin(\delta)$$ [Math 15]

The rotor position inferring section 28 inputs the γ current Iγ that is output from the γ current calculating section 26 and the inferred value IγH of the γ current that is output from the γ current inferring section 27 and finds and calculates the inferred value of the rotor position θH and the inferred value of the rotor angular velocity ωH by the following calculation such that the deviation of Iγ and IγH is zero.

$$\omega H = \frac{KpSL \cdot s + KiSL}{s} \cdot Kpn \cdot (I\gamma H - I\gamma)$$ [math 16]

When ωH>0, Kpn=1
When ωH<0, Kpn=−1

(where KpSL is the proportional gain, KiSL is the integrated gain and s is the Laplace operator)

By employing a motor control device 10C constructed as above, just as in the case of the first embodiment, even when the motor 30 is constituted by a reluctance motor or reluctance torque/permanent magnet motor designed with a high ratio of the reluctance torque with respect to the permanent magnet torque, the rotor position can be accurately inferred without providing a rotor position sensor.

(Fourth Embodiment)

Figure 7:
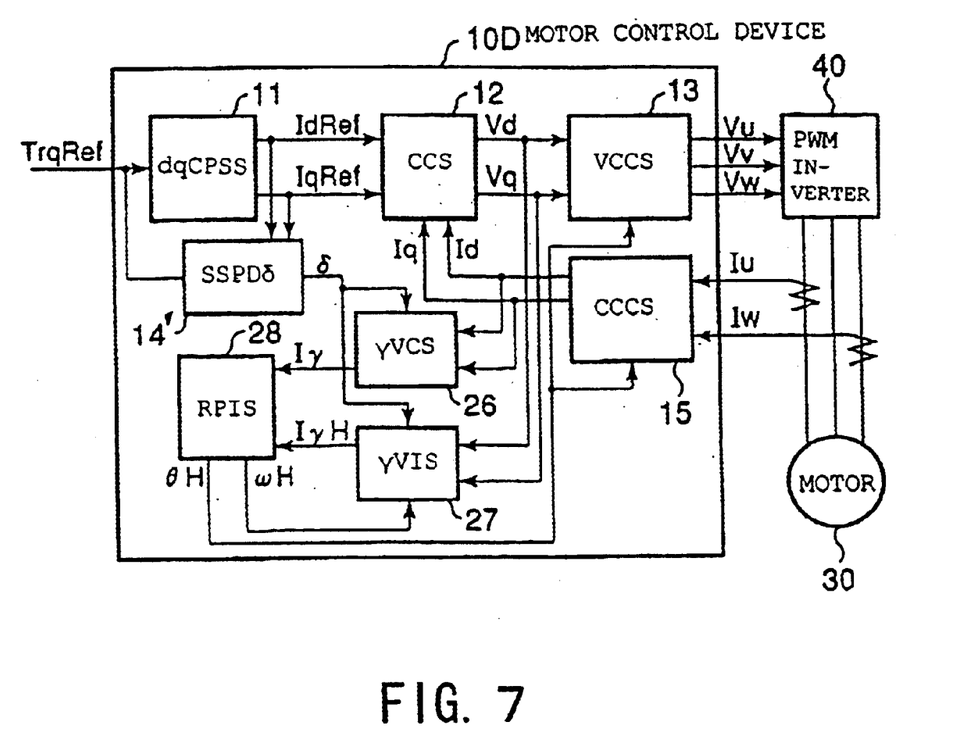
FIG. 7 is a block diagram showing a fourth embodiment of a method of controlling a motor and a device therefor according to the present invention.

Next, a fourth embodiment will be described with reference to FIG. 7.

The motor control device 10D in the fourth embodiment is the same as that in the third embodiment apart from the setting section 14' for phase difference δ (SSPDδ).

The setting section 14' for phase difference δ inputs the d and q axis current instructions IdRef and IqRef that are output from the dq current pattern setting section 11 and finds and outputs the phase difference (phase angle) δ by the following calculation.

$$\delta = -\tan^{-1}\left(\frac{Lq \cdot Iq\ Ref}{Ld \cdot Id\ Ref}\right)$$ [math 17]

If the phase angle δ is set using the above expression, when error is generated between the motor rotor phase angle θH and the true rotor phase θ, the voltage change in the γ axis direction can be made to be substantially a maximum.

Consequently, by employing a motor control device 10D constructed as above, just as in the case of the first embodiment, even when the motor 30 is constituted by a reluctance motor or reluctance torque/permanent magnet motor designed with a high ratio of the reluctance torque with respect co the permanent magnet torque, the rotor position can be accurately inferred without providing a rotor position sensor.

With the present invention as described above, a method of controlling a motor and a device therefor can be provided whereby the rotor position can be accurately inferred and the output torque thereby controlled with high accuracy at high speed.

Obviously, numerous additional modifications and variations of the present invention are possible in light of the above teachings. It is therefore to be understood that within the scope of the appended claims, the present invention may be practiced otherwise than as specially described herein.

What is claimed is:

1. A method of controlling a reluctance torque/permanent magnet motor which has a rotor with a protuberant magnetic polarity, comprising the steps of:

comparing on a γ axis an inferred voltage of said γ axis, which is inferred and calculated by using a detected value of a motor current and a motor equivalent circuit constant and a γ axis component voltage applied to a motor, if an inferred axis of a rotor permanent magnet flux direction is defined as a dr axis, a direction orthogonal to said dr axis as a qr axis, and an axis offset by a predetermined angle from said dr axis as said γ axis; and inferring and calculating a phase difference (a phase angle) of said dr axis so that a deviation thereof substantially becomes zero.

2. The method of controlling a motor according to claim 1, wherein said phase difference δ of said γ axis and said dr axis is variable in response to a torque instruction.

3. The method of controlling a motor according to claim 1, wherein said phase difference δ of said γ axis and said dr axis is variable in response to dr and qr axis current instructions.

4. A method of controlling a reluctance torque/permanent magnet motor which has a rotor with a protuberant magnetic polarity, comprising the steps of:

comparing on a γ axis an inferred current value of said γ axis, which is inferred and calculated by using a voltage that is applied to a motor and a motor equivalent circuit constant and a detected current value of said γ axis, if an inferred axis of a rotor permanent magnet flux direction is defined as a dr axis, a direction orthogonal to said dr axis as a qr axis, and an axis offset by a predetermined angle from said dr axis as said γ axis; and inferring and calculating a phase difference (a phase angle) of said dr axis so that a deviation thereof substantially becomes zero.

5. The method of controlling a motor according to claim 4, wherein said phase difference δ of said γ axis and said dr axis is variable in response to a torque instruction.

6. The method of controlling a motor according to claim 4, wherein said phase difference δ of said γ axis and said dr axis is variable in response to dr and qr axis current instructions.

7. A method of controlling a reluctance motor which has a rotor with a protuberant magnetic polarity, comprising the steps of:

comparing on a γ axis an inferred voltage of a γ axis, which is inferred and calculated by using a detected value of a motor current and a motor equivalent circuit constant and a γ axis component voltage applied to a motor, if an inferred axis of a rotor permanent magnet flux direction is defined as a dr axis, a direction orthogonal to said dr axis as a qr axis, and an axis offset by a predetermined angle from said dr axis as said γ axis; and inferring and calculating a phase difference (a phase angle) of said dr axis so that a deviation thereof substantially becomes zero.

8. A method of controlling a reluctance motor which has a rotor with a protuberant magnetic polarity, comprising the steps of:

comparing on a γ axis an inferred current value of said γ axis, which is inferred and calculated by using a voltage that is applied to a motor and a motor equivalent circuit constant and a detected current value of said γ axis, if an inferred axis of a rotor permanent magnet flux direction is defined as a dr axis, a direction orthogonal to said dr axis as a qr axis, and an axis offset by a predetermined angle from said dr axis as said γ axis; and inferring and calculating a phase difference (a phase angle) of said dr axis so that a deviation thereof substantially becomes zero.

9. A motor control device that supplies an operating voltage instruction to an inverter section for driving a motor, comprising:

means for comparing on a γ axis, an inferred γ axis voltage value which is inferred and calculated by using a detected value of a motor current and a motor equivalent circuit constant and a γ axis component voltage applied to said motor, where an inferred axis of a rotor permanent magnet flux direction is defined as a dr axis, a direction orthogonal to said dr axis as a qr axis, and an axis offset by a predetermined angle from said dr axis as said γ axis; and means for inferring and calculating said dr axis phase difference so that a deviation of said γ axis inferred voltage value and said γ axis component voltage obtained by said means for comparing becomes substantially zero.

10. A motor control device that supplies an operating voltage instruction to an inverter section for driving a motor, comprising:

means for comparing, on a γ axis, an inferred γ axis current value which is inferred and calculated by using a voltage applied to said motor and motor equivalent circuit constant and a detected current value of said γ axis, where an inferred axis of a rotor permanent magnet flux direction is defined as a dr axis, a direction orthogonal to said dr axis as a qr axis, and an axis offset by a predetermined angle from said dr axis as said γ axis; and means for inferring and calculating a dr axis phase difference so that a deviation of said inferred current value of said γ axis and a detected value of said γ axis obtained by said means for comparing becomes substantially zero.

* * * * *